(12) United States Patent
Buhl et al.

(10) Patent No.: US 7,425,138 B2
(45) Date of Patent: Sep. 16, 2008

(54) TWO-PART HOUSING FOR RECEIVING ELECTRONIC COMPONENTS AND PROCESS CONNECTION MEANS FOR USE IN PROCESS MEASUREMENT TECHNOLOGY

(75) Inventors: Peter Buhl, Tettnang (DE); Nikola Natterer, Berg (DE)

(73) Assignee: ifm electronic GmbH, Essen (DE)

( * ) Notice: Subject to any disclaimer, the term of this patent is extended or adjusted under 35 U.S.C. 154(b) by 0 days.

(21) Appl. No.: 11/726,786

(22) Filed: Mar. 23, 2007

(65) Prior Publication Data

US 2008/0182444 A1 Jul. 31, 2008

(30) Foreign Application Priority Data

Jan. 31, 2007 (DE) .................. 10 2007 004 895

(51) Int. Cl.
*H01R 12/00* (2006.01)
(52) U.S. Cl. .................... 439/76.1; 439/913; 73/431
(58) Field of Classification Search ............... 439/76.1, 439/913; 73/431
See application file for complete search history.

(56) References Cited

U.S. PATENT DOCUMENTS

| | | | | |
|---|---|---|---|---|
| 3,793,545 A | * | 2/1974 | Leiber et al. ............... 310/168 |
| 4,640,135 A | * | 2/1987 | Kastel et al. ................. 73/716 |
| 4,983,271 A | * | 1/1991 | Kato et al. ................... 204/426 |
| 5,949,023 A | * | 9/1999 | Weyl ......................... 174/77 R |
| 5,984,645 A | * | 11/1999 | Cummings .................. 417/307 |
| 6,035,722 A | * | 3/2000 | Giersch et al. ................ 73/714 |
| 6,112,592 A | * | 9/2000 | Kathan .......................... 73/431 |
| 6,423,197 B1 | * | 7/2002 | Lenferink et al. ........... 204/408 |
| 2007/0033823 A1 | * | 2/2007 | Steinich ....................... 33/756 |
| 2007/0102639 A1 | * | 5/2007 | Cutler et al. .......... 250/339.13 |
| 2007/0161268 A1 | * | 7/2007 | Muschketat ................ 439/76.1 |

FOREIGN PATENT DOCUMENTS

DE 19724309 12/1998
DE 10108350 8/2002

\* cited by examiner

*Primary Examiner*—Tho D Ta
(74) *Attorney, Agent, or Firm*—Gerald T. Bodner

(57) ABSTRACT

The invention relates to an assembly for use in automation and process measurement technology, comprising an at least two-part compact housing having a sleeve-shaped housing bottom part and housing top part. According to the invention the housing top part and the housing bottom part are each made integrally from a creep-resistant material and have an overlapping region extending in an axial direction, wherein the cross-sectional shape of the housing top part and the housing bottom part is complementary at least in the overlapping region and the housing parts have an oversize relative to one another. The housing top and bottom parts are connected to each other by axial pressing forces with oversize loss in a media-tight manner.

20 Claims, 12 Drawing Sheets

TWO-PART HOUSING FOR RECEIVING ELECTRONIC COMPONENTS AND PROCESS CONNECTION MEANS FOR USE IN PROCESS MEASUREMENT TECHNOLOGY

The invention relates to an assembly for use in process measurement technology, comprising an at least two-part compact housing having a sleeve-shaped housing bottom part and housing top part, wherein the housing parts serve as receiver for necessary electronic components and process connection means are provided on at least one housing part, in accordance with the preamble of patent claim 1.

An assembly in the form of a sensor housing with a process connection is known from the generic document DE 197 24 309 A1, which is based on a two-part housing, e.g. for pressure or flow sensors, comprising a housing bottom part and a top part.

The bottom part serves as process connection while the top part accommodates electronic components. The bottom part and the top part are joined by connecting the bottom part and the top part by an elastic press fit connection, with straight surfaces and curved surfaces being provided in the area of the press fit. By means of the elastic press fit and the different design of the surfaces the tolerances of the inside diameter and the outside diameter of the top and bottom part of the housing need not be made especially narrow so that damages to the top or bottom part of the housing are reduced. The necessary straight and curved surfaces are located preferably in the area of the bottom part where they form a press fit surface. When the top part and the bottom part are joined, the top part in the area of the curved surfaces then adjoins the bottom part, while in the area of the straight surfaces it adjoins the bottom part only slightly or not at all, so that a free space is formed between the top part and the bottom part. The top part can thus deform in the direction of the straight surfaces without cracks forming. In one embodiment of the solution of this prior art there is a groove for additionally receiving an O-ring provided on the bottom part underneath the press fit surface. Only with this O-ring is the necessary sealing of the housing achieved.

To facilitate the joining of the top and bottom part of the housing according to DE 197 24 309 A1 the top edge of the bottom part defines an insertion cone above the press fit surface. Moreover, the joining is to be facilitated in that the wall thickness of the top part decreases in the press fit area. This decrease of the wall thickness is to take place both incrementally or also continuously in the direction to the bottom part. According to the solution of the prior art the top part is produced in the form of a welded sleeve and comprises a hole for a plug connection.

It has shown that the elastic press fit according to the teaching of DE 197 24 309 A1 does not comply with the essential requirements with respect to media tightness, specifically gas tightness, so that the long-term stability of a corresponding housing assembly and a sensor with an evaluation circuit received therein is only insufficient. Moreover, the provision of different surfaces comprising curved and straight portions is technologically complicated, so that the realization of the above-explained two-part housing for sensors incurs altogether more costs.

Further known is a unit comprised of a proximity switch and a cable terminal part according to DE 101 08 350 C1. The proximity switch comprises an outside housing and an insulation part, and the insulation part is provided on the end face of the outside housing. The terminal element has terminals leading to the outside, which are made as terminal sockets. The cable terminal part has a cable and a connecting part, with the cable being attached in the connecting part and the ends of the wires of the cable being connected in an electrically conductive manner to terminal sockets of the terminal element. To comply with necessary tightness and stability requirements the cable terminal part comprises a cap which surrounds at least the connecting part. The cable terminal part is attached to the outside housing by means of said cap. This attachment is accomplished by means of a catch connection and/or stamping onto the outside housing. The end of the cap facing away from the proximity switch may have a conically tapered shape.

To ensure the required tightness and strain relief a ring is assembled with the connecting part. The ring can be shifted out of a first form, in which the inside diameter of the ring is greater than or equal to the outside diameter of the connecting part or greater than or equal to the outside dimensions of the cable, into a second form in which the inside diameter of the ring is less than the outside dimensions of the connecting part or less than the outside dimensions of the cable. The ring is preferably located in a groove which is formed in the connecting part, and is made of a metallic material.

This embodiment of a cable terminal part requires a plurality of parts which results in higher costs and also in an increased assembly expenditure.

The company-internal prior art also includes laser-welded housings with a screwed cable bushing and strain relief. Such housings require a large number of parts and do not achieve any gas tightness.

Based on the above the invention therefore has the object to provide an improved assembly for use in all fields of automation and process measurement technology, comprising an at least two-part compact housing having a sleeve-shaped housing bottom part and housing top part, to permit the realization of the connection between the housing parts in a simple technological manner with sufficient media tightness, specifically helium-tightness, and hence with long-term stability.

A further object of the invention is to provide a reliable design for the connecting point at which necessary electrical cables are introduced into the housing, with the connecting point likewise being designed in a media-tight manner and simultaneously achieving the required strain relief for the cable. The assembly is to be usable as a sensor housing, for receiving a measuring instrument with and without signal processing components, or a display unit, but also, for example, for proximity switches.

The solution to the object according to the invention is achieved with the combination of the features defined in patent claim 1, wherein the dependent claims represent at least useful embodiments and advancements.

The assembly according to the invention, e.g. for use as a sensor to be applied in process measurement technology, is based on an at least two-part housing having a sleeve-shaped housing bottom part and housing top part, with said housing top part serving, for example, as a receiver for the major part of necessary electronic components and with process connection means being provided on the housing bottom part in a manner known per se.

According to the invention the housing top part and the housing bottom part are each made integrally from a creep-resistant material, e.g. special steel, V2A or V4A. The housing top and housing bottom part have an overlapping region extending in an axial direction, wherein the cross-sectional shape of the housing top part and the housing bottom part is complementary, e.g. cylindrical, at least in this overlapping region and the housing parts have an oversize relative to one another.

The housing top and bottom part are connected to each other by an axial pressing force with oversize loss in a media-tight manner. With this connection type additional sealing means such as an O-ring could be omitted. Also, it is not necessary to provide for an additional adhesive connection at the connecting point, e.g. by welding.

According to a preferred embodiment the housing parts are made of a deep-drawn metallic material, but can also be fabricated by means of turning or casting.

To limit the joining distance, one of the housing parts may have a radially extending bead.

Again according to a preferred embodiment the housing top part is formed as a hood and has at its open bottom side an expanded inside diameter surrounding collar, so that the inside of the housing has a smooth surface in the assembled state, that is, when the housing bottom part is pressed in.

At the bottom side of the collar of the housing top part an insertion chamfer or insertion slant is provided. This insertion chamfer or insertion slant may also be formed in the deep-drawing process, so that an additional processing step is omitted.

In one embodiment of the invention the housing bottom part has an oversized diameter with respect to the inside collar dimension of the housing top part.

The expansion of the diameter of the surrounding collar corresponds substantially to double the wall thickness of the housing bottom part.

A through opening may be provided on both the housing top part and the housing bottom part. The through opening on the housing top part serves to connect the electronic components located inside the housing by means of a multicore cable known per se.

The opening on the housing bottom part serves the attachment, e.g. of a pipe connection with an external thread and screwing surface by means of which the sensor is connectable with a corresponding opening to the media-carrying line.

For protecting the electronic components an insulating insert may be provided in the housing top part, or the housing inside part may be provided with an insulating coating.

The through opening of the housing top part is surrounded by a surrounding, outwardly projecting connection piece or ring, wherein the aforementioned connecting cable is introduced into the housing top part through the through opening and the connecting cable comprises a grommet-like coat and a metallic cap.

The connection piece or ring can be realized either in a deep-drawing process, by stamping or welding it on as a corresponding separate component.

The grommet-like coat includes over its longitudinal expansion portions having a different stepped diameter as well as several radially surrounding sealing lamellae at the end toward the housing, which are spaced apart from each other.

The cap, which is preferably a metallic one, has a shape which is complementary to the stepped diameter of the coat, wherein the end of the cap facing the housing top part is connectable to the connection piece or ring in a force-closed manner while the opposite end of the cap can be connected to the coat in a form-closed manner, e.g. by crimping.

It can be seen from the above that the advancement of the assembly, e.g. for a sensor or a sensor unit, is based on a two-part housing comprising a top part or top sleeve and a bottom part or bottom sleeve which can each be fabricated in a deep-drawing step. The sleeves have an oversize of, for example, 5/10 mm with respect to each other and are connected to each other by means of a press fit with their open ends positioned to one another correspondingly. This press fit is in the form of a longitudinal press connection obtained by the action of an axial press-in force. The sliding movement of the joint faces of the corresponding sections of the top and bottom parts of the housing provides for a partial leveling of the roughness of these surfaces which results in the aforementioned oversize loss. To guarantee a constancy of the joint press fit over the time non-creeping materials are used, that is, materials not yielding mechanical tension, i.e. metals.

In the explained embodiment of the housing top and housing bottom part it is assumed that the housing bottom part is pressed into the expanded inside diameter housing top part or into the surrounding collar provided thereon. Alternatively, with a corresponding diameter relationship, it is of course also possible that the top part be pressed into the bottom part, without departing form the basic gist of the invention.

To ensure the necessary gas tightness the length of the axial overlapping region should not be under less than a fifth of the longitudinal expansion of the total housing or, respectively, should not be substantially smaller than a distance of $>=5$ mm. The ratio material or wall thickness to joining distance should be within a range of 8-35 and the wall thickness should be at about 0.3 to 1.4 mm. The ratio of the length or depth, respectively, of the sleeves to the diameter thereof is chosen to be within the range of 0.5 to 6.

The invention will be explained in more detail below, by means of an exemplary embodiment and with reference to the figures:

In the figures:

FIG. 1a-d show various representations of the assembly according to the invention as a sensor with a two-part housing after the accomplishment of the longitudinal press connection for joining the housing parts;

FIG. 2a, b show representations similar to the ones of FIG. 1a, b, but prior to the accomplished longitudinal press connection;

FIG. 3 shows a representation of the connecting cable with a cable grommet coat and a cap including the detail X (coat region) and the detail J (lamellae shape in the end portion of the grommet);

FIGS. 4a-d show representations of various shapes for possible metallic caps for fixing the connecting cable;

FIGS. 5a-c show different embodiments of the metallic ring as an adaptor for the cap for fixing the connecting cable;

FIG. 6a, b shows representations of embodiments of the housing top part with and without a bead or inside diameter expansion, respectively;

Figure 9:
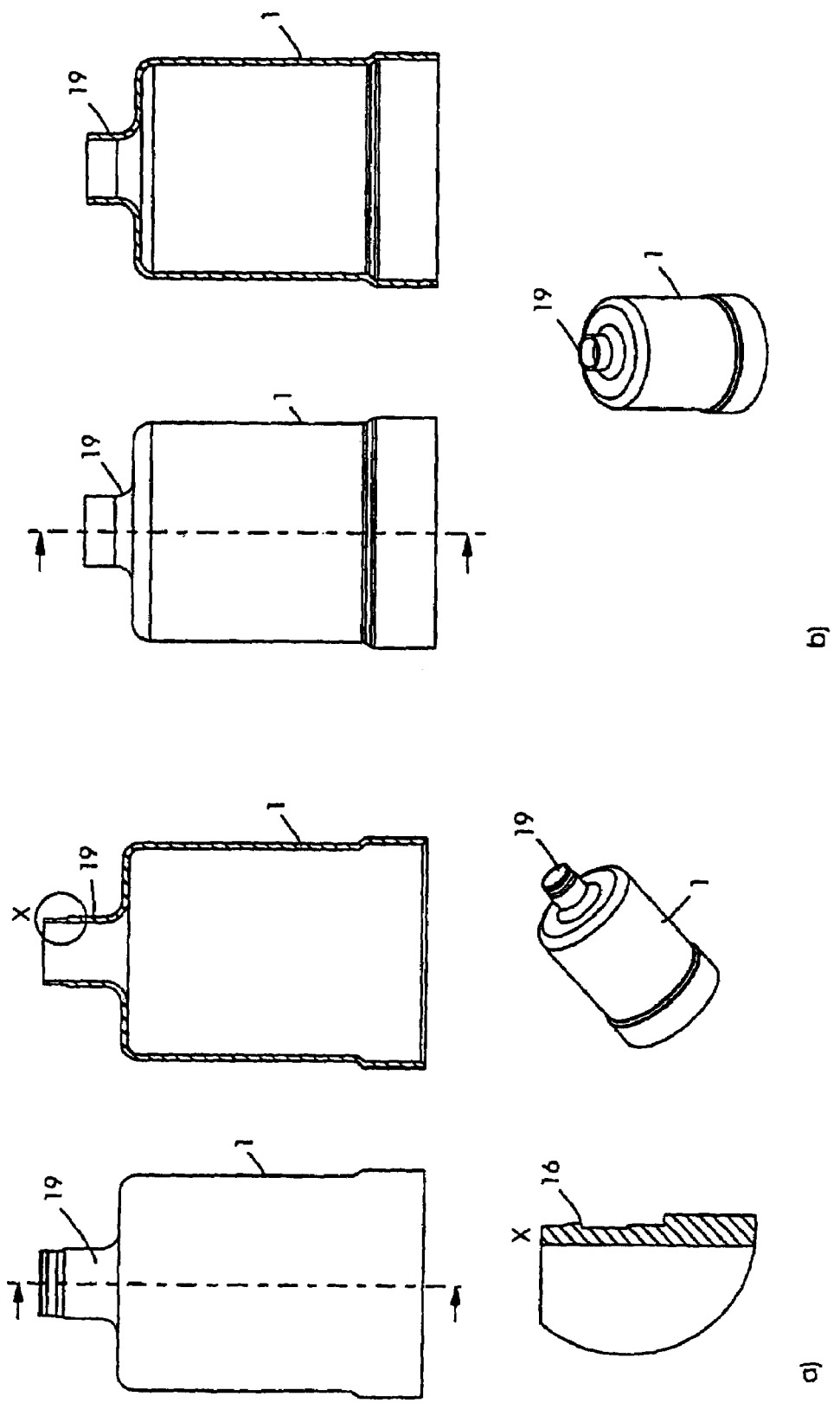
Figure 10:
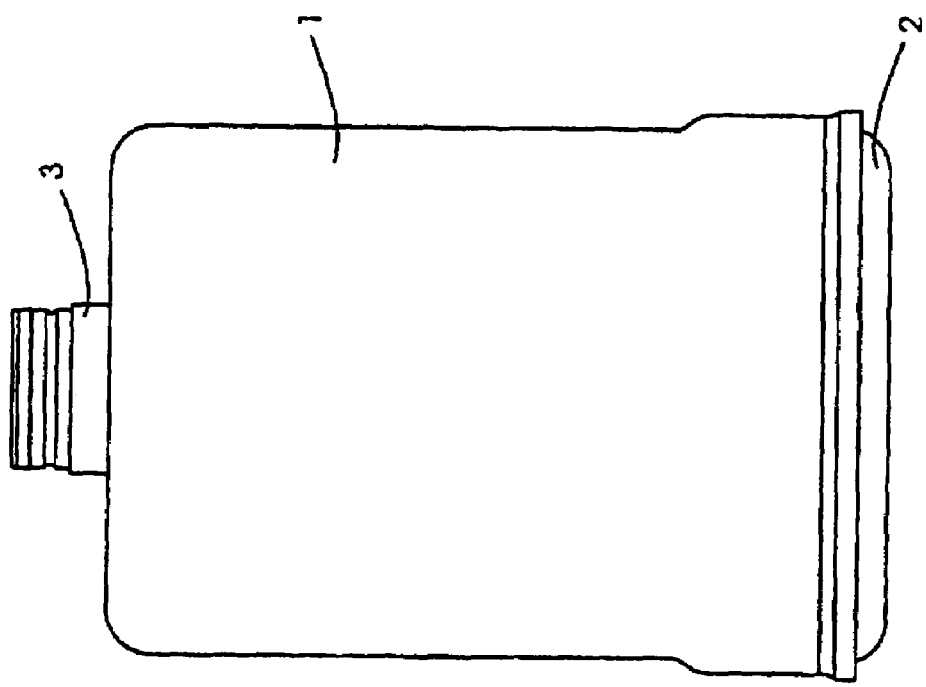
Figure 11:
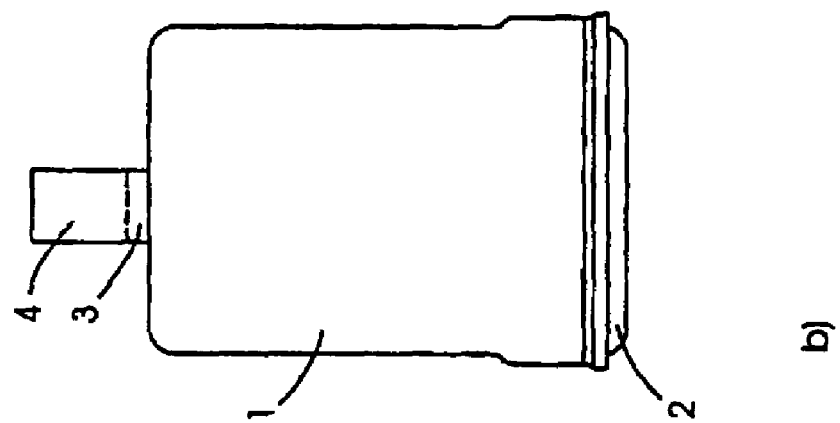
Figure 11:
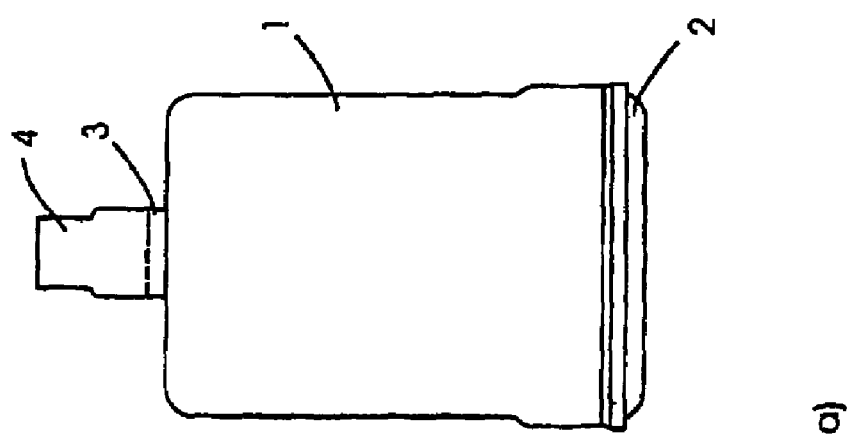
Figure 12:
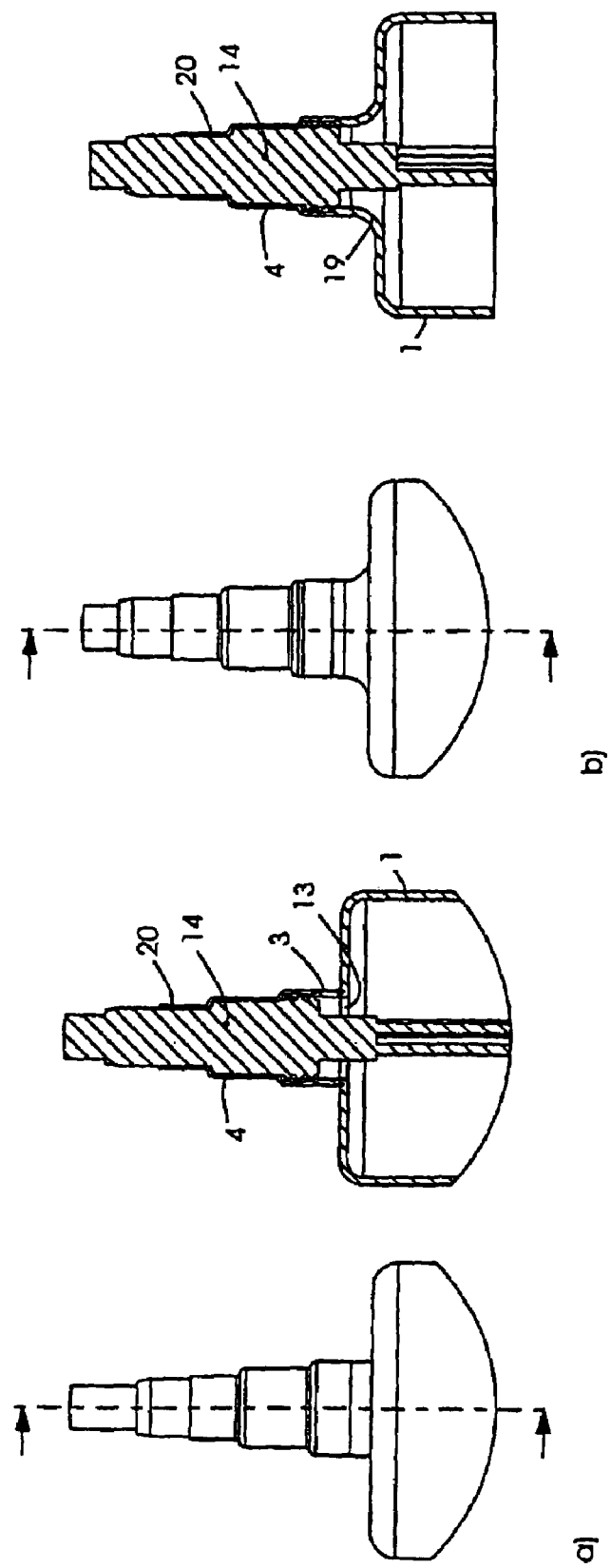

FIG. 9a, b show representations of the housing top part with adaptor for the cap for fixing the connecting cable which was realized in a deep-drawing step;

FIG. 10 shows a representation of the press fit assembly with adaptor;

FIG. 11a, b show representations of the press fit assembly with a stepped metallic cap (FIG. 11a) and a straight cap (FIG. 11b); and FIG. 12a, b show representations of the detail of the cable gland with adaptor for the metallic cap fixed to and formed on the same separately.

Figure 1:
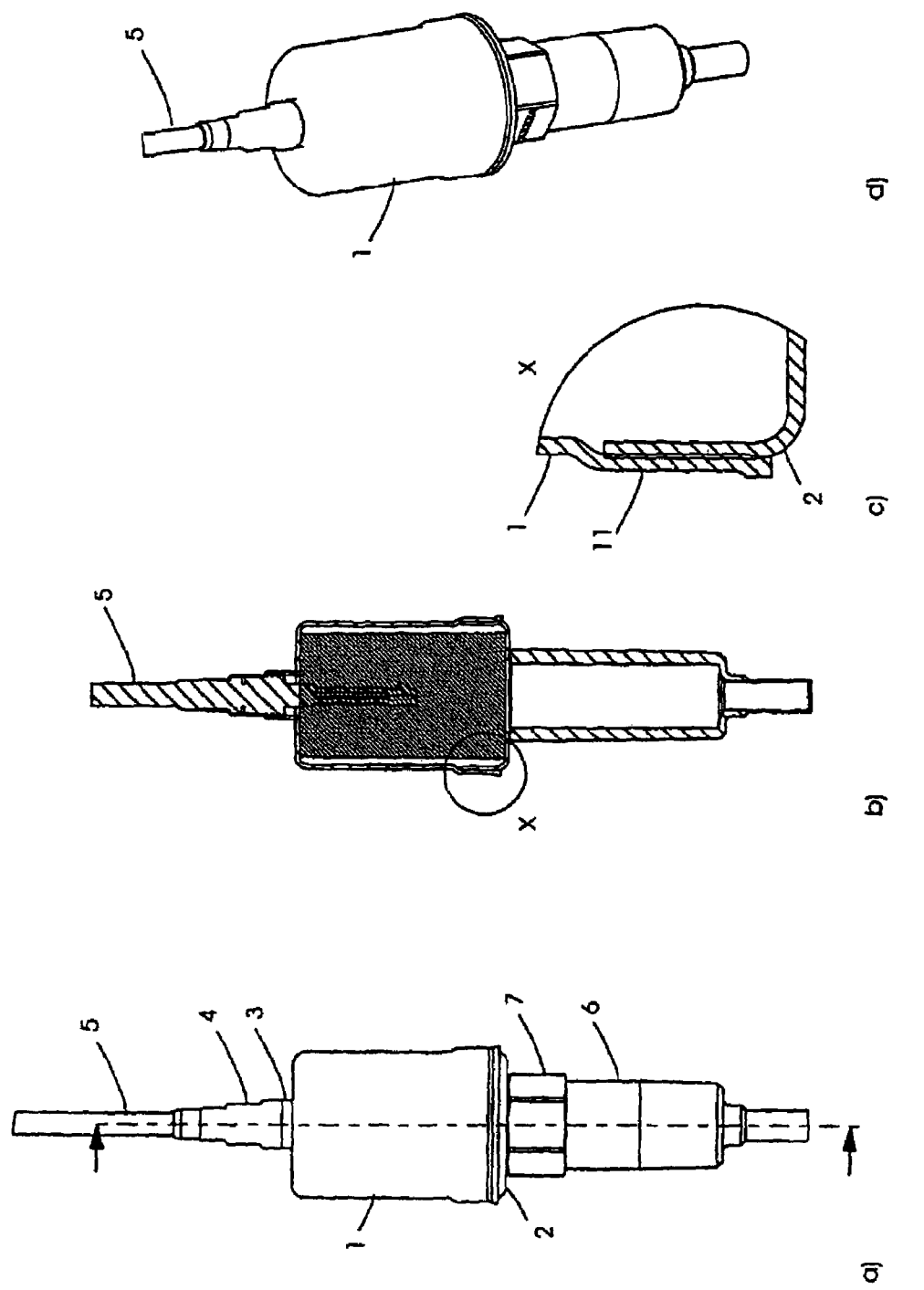
Figure 2:
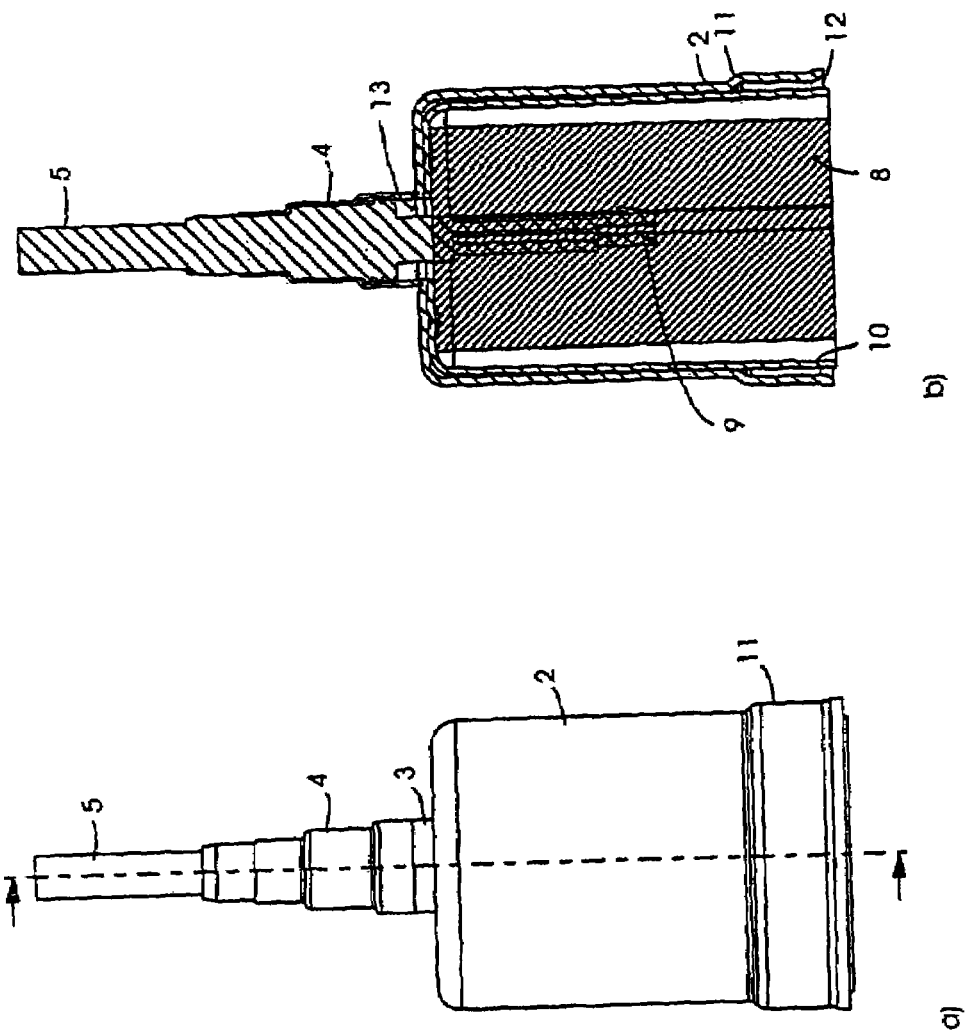

According to the representations of FIGS. 1 and 2 the assembly, e.g. as a sensor for use in process measurement technology, comprises a two-part housing with a housing top part 1 and a housing bottom part 2.

On the housing top part 1, a metallic ring 3 is fixed to a through opening provided on the end face thereof, preferably by welding.

The metallic ring 3 is adjoined by a metallic cap 4 at the end of which an electrical connecting cable 5 comes out.

The housing bottom part 2 comprises the process connection 6 with screwing surface 7.

As can be seen from the sectional representation of FIGS. 1 and 2 both the housing top part and the housing bottom part 1; 2 are sleeve-shaped with one open side. A printed circuit board 8 with the electronic components required for the signal preprocessing is provided inside the housing top part 1.

The ends 9 of the connecting cable 5 are in electrical contact with the printed circuit board 8.

The inside of the housing top part 1 is provided with an insulating insert 10 which can be realized, for example, by a molded plastic part or also by an insulating inside coating.

With respect to its basic shape the housing top part 1 corresponds to a hood and may have at its open bottom side a surrounding expanded inside diameter collar 11. The axial length of the surrounding collar 11 may limit the joining distance.

An insertion chamfer or insertion slant 12 is provided on the bottom side of the collar. This insertion slant 12 serves the easier accommodation and secures the guidance of the housing bottom part 2 during the realization of the longitudinal press connection by a relative movement of the housing top part and the housing bottom part 1; 2 with respect to one another.

The housing bottom part 2 has an outside oversize diameter with respect to the inside dimension of the collar of the housing top part 1.

The expansion of the diameter of the surrounding collar 11 corresponds substantially to double the lateral wall thickness of the housing bottom part 2.

To prevent scoring during the realization of the longitudinal press connection of the housing top and housing bottom part both the surrounding collar 11 and the open end of the housing bottom part 2 are smoothed, i.e. burr-free.

With an exemplary wall thickness of the housing top and housing bottom part 1; 2 in the range of about 0.8 to 1.0 mm, a longitudinal joining distance of, for example, 10 mm and a maximum roughness height Rmax<=6.3 the joining together is done with an expenditure of force of approximately 22 kN without an undesired shaping variation of the housing structure outside the joining zone.

Figure 3:
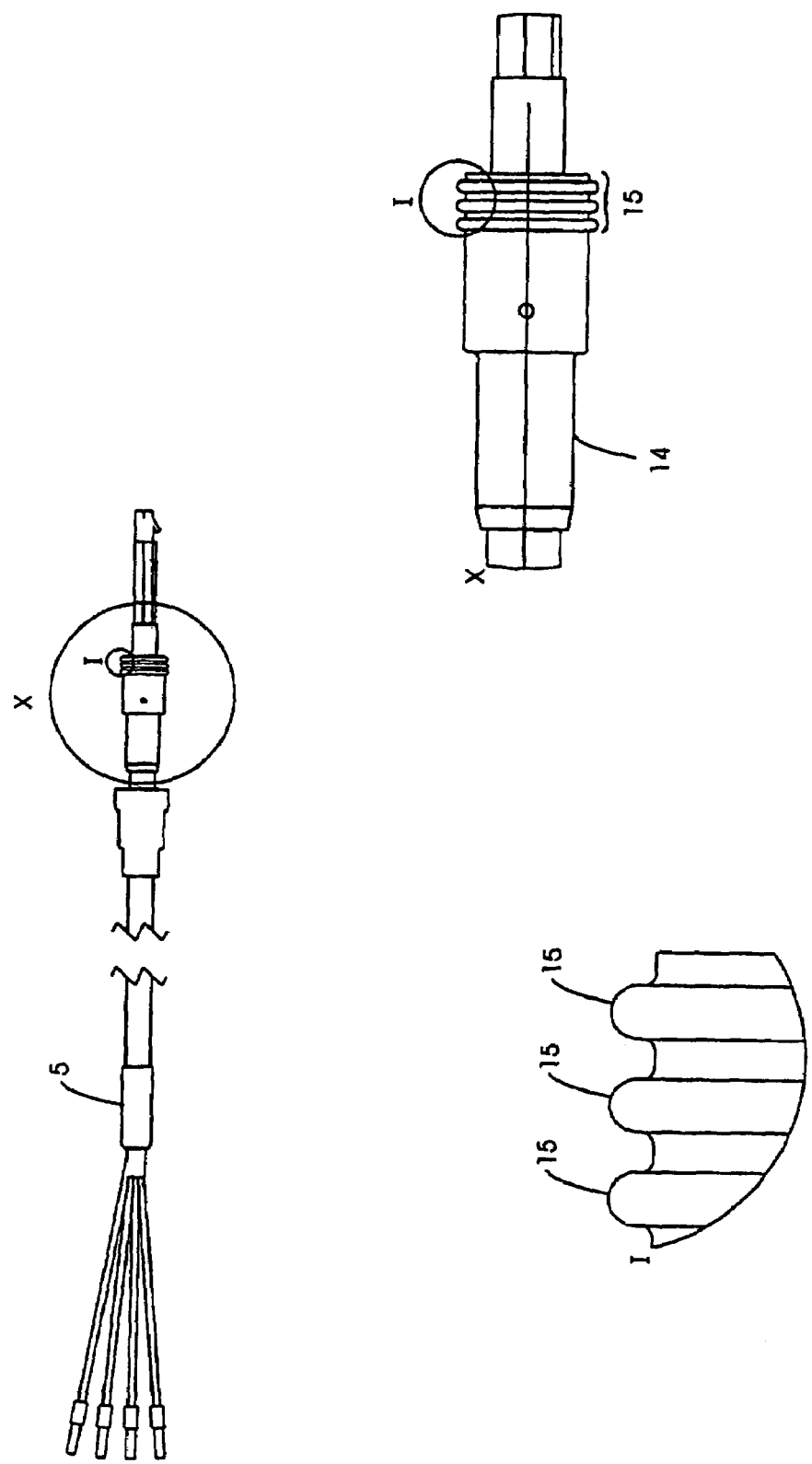

To guarantee the tightness of the entire sensor assembly also in the region of the electrical connecting cable 5 a novel cable bushing is realized with reference to FIG. 3.

As explained above already, a metallic ring 3 as adaptor for the metallic cap 4 is provided in the region of the through opening 13 of the housing top part 1.

This metallic ring 3 receives in its inside one end of a grommet-like coat 14 of the connecting cable 5.

The grommet-like coat 14 has a diameter that increases from the free cable end toward the region of the housing top part in steps.

At the end on the housing side, the coat 14 includes several radially surrounding sealing lamellae 15 spaced apart from each other, three of them in the shown example. On the outside periphery the sealing lamellae 15 are brought into contact with the inner surface of the metallic ring 3 or, respectively, with the end of the metallic cap 4 on the housing side.

The spaced-apart sealing lamellae 15 form a labyrinth seal.

The end of the metallic cap 4 facing toward the housing top part is connected to the metallic ring 3 preferably by pressing.

At the outside end, that is, the end facing away from the housing top part 1, the metallic cap 4 is subjected to a crimping step. This crimping step fixes the cable 5 via the coat 14.

The coat 14 acts as a sealing grommet, with the coating material being a thermoplastic polyurethane resin having a shore hardness of A77±5.

The stepped diameter of the coat 14 in combination with the sealing lamellae 15 and the crimping step and the adhesive connection of the metallic cap 4 to the housing top part 1 result in the necessary strain relief of the connecting cable 5 and the required media tightness.

In one embodiment of the invention, the metallic cap 4 is not fixed flush with the metallic ring 3, but by slipping it over, which further improves the tightness.

Figure 4:
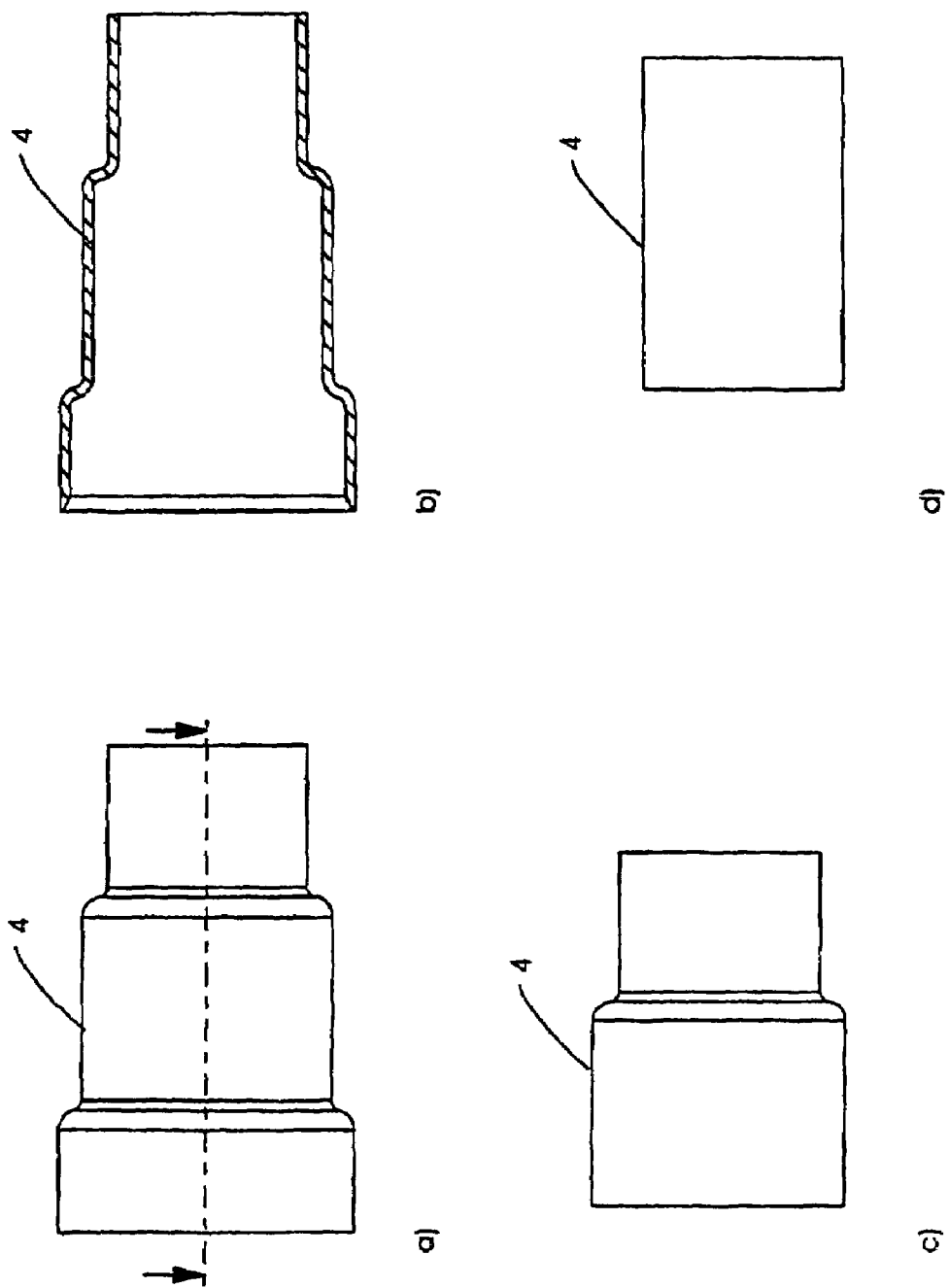

FIGS. 4*a* and *b* show a lateral view and a sectional view of a metallic cap 4 having a multiple graduation of the diameter. The graduation with the larger opening width shown on the left of the figure serves the fixation of the cap 4 on the ring 3, namely by slipping it over and pressing it on.

The central section of the metallic cap 4 receives a part of the coat 14 of the connecting cable 5, with the smallest diameter part shown on the right of the figure representing the crimping section.

The representation of FIG. 4*c* shows a single graduation, and the representation of FIG. 4*d* shows a zero graduation, that is, the metallic cap 4 is a cylindrical sleeve.

Figure 5:
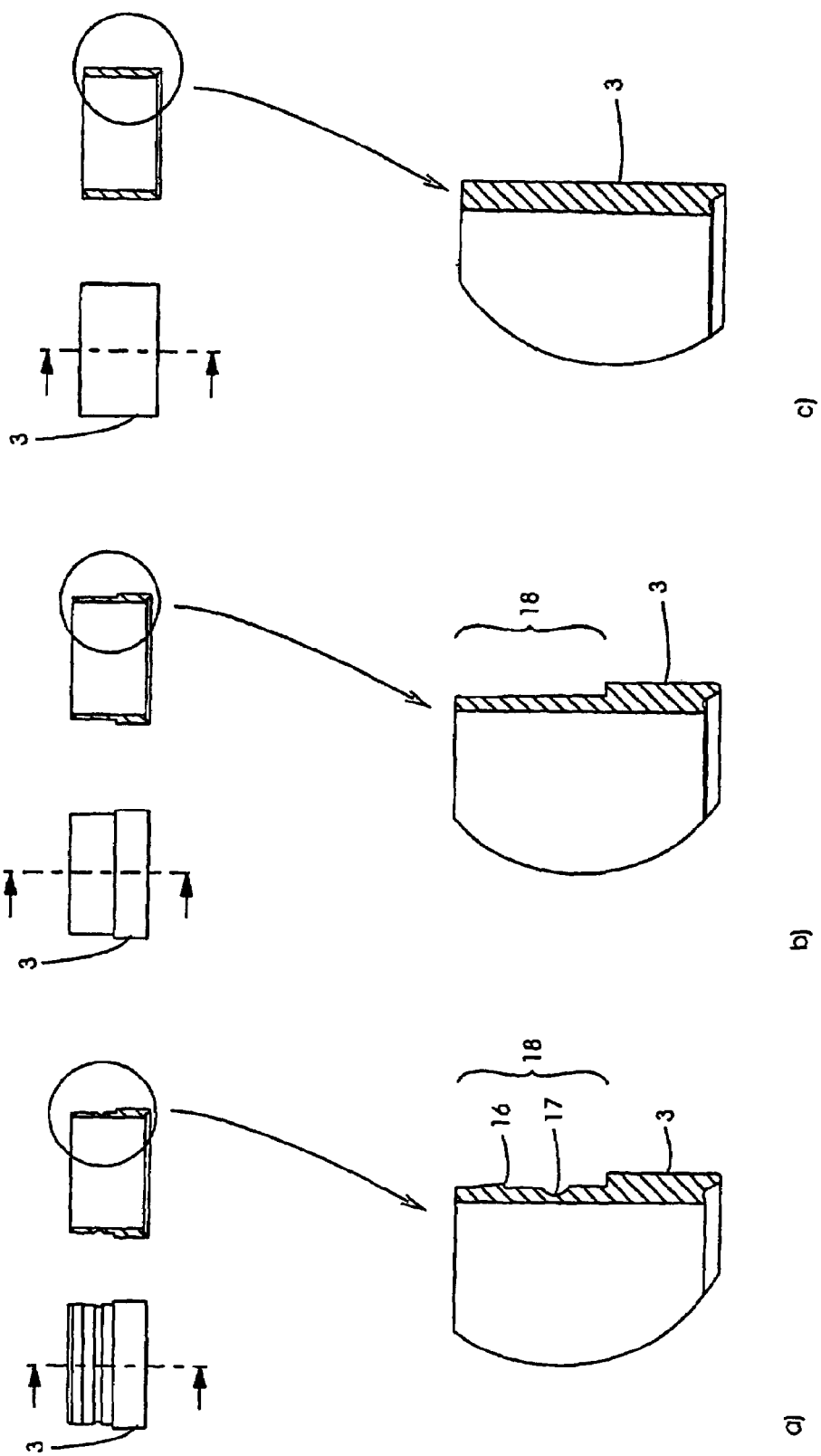

Various design options of the ring 3 as adaptor for the cap 4 for fixing the connecting cable 5 are to be explained by means of FIG. 5.

In the embodiment of FIG. 5*a* it can be seen in the detailed illustration that the upper section of the ring 3 has a surrounding projection 16 as well as a surrounding recess 17 formed as a groove.

Both the surrounding projection 16 and the surrounding recess 17 are located in a reduced diameter section 18.

If the largest diameter end of the cap 4 (see FIG. 4) is pushed onto the reduced diameter section 18 by the action of a pressing force the metallic cap 4 and the ring 3 are connected to each other by a combination of form closure and force closure, with the surrounding projection 16 forming a barb.

As can be seen in the representation of FIG. 5*b* as alternative embodiment the projection 16 and the recess 17 may be waived and the reduced diameter section 18 may be wedge-shaped, i.e. the diameter is reduced from the graduation area to the upper free end of the ring 3 continuously or discontinuously.

Finally, the ring 3 may also be formed as a constant diameter sleeve as shown in FIG. 5*c*.

Figure 6:
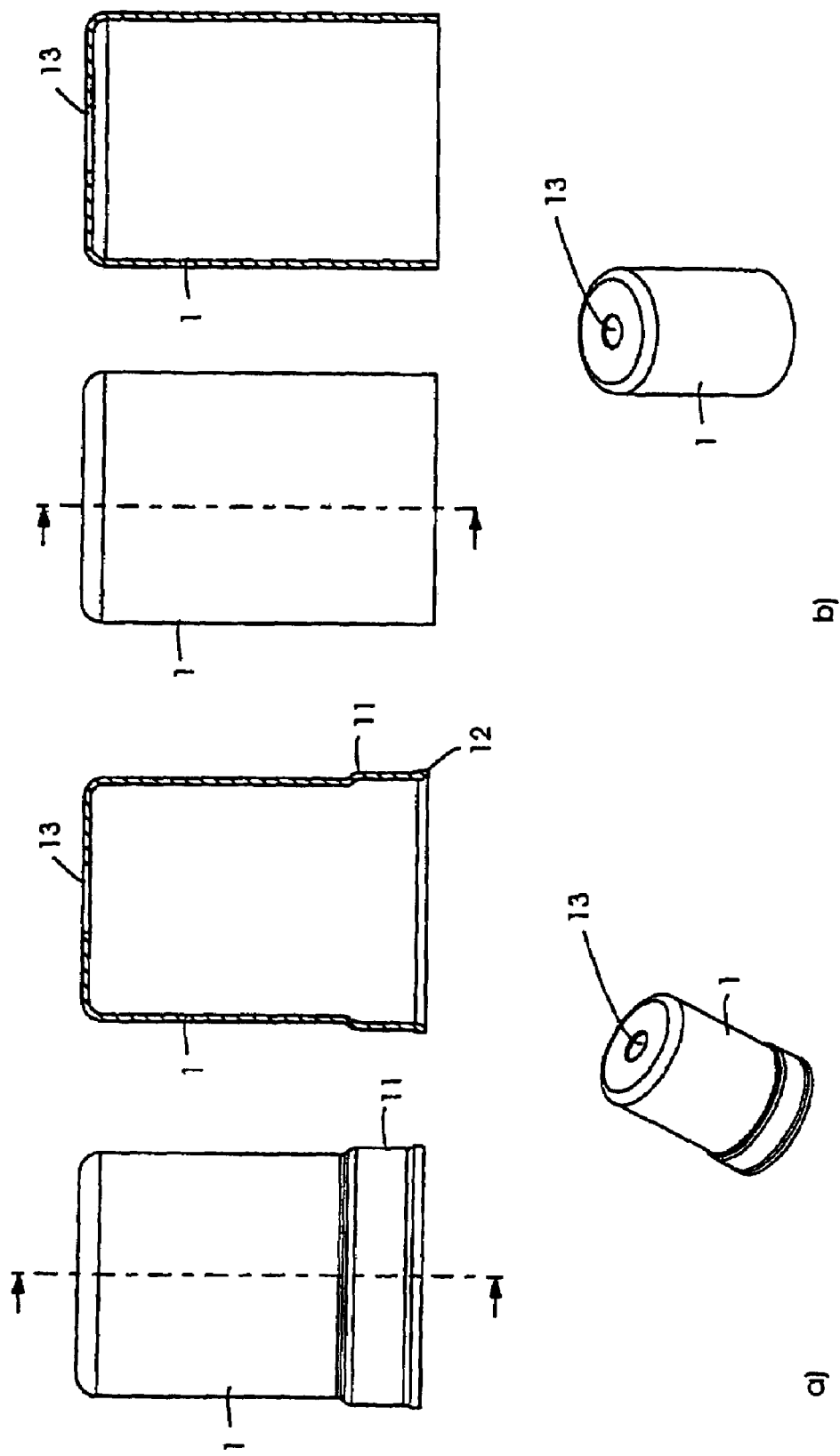

FIGS. 6*a* and 6*b* show representations of lateral, sectional and perspective views of embodiments of the housing top part 1 with and without bead 11 or, respectively, expanded inside diameter.

Figure 7:
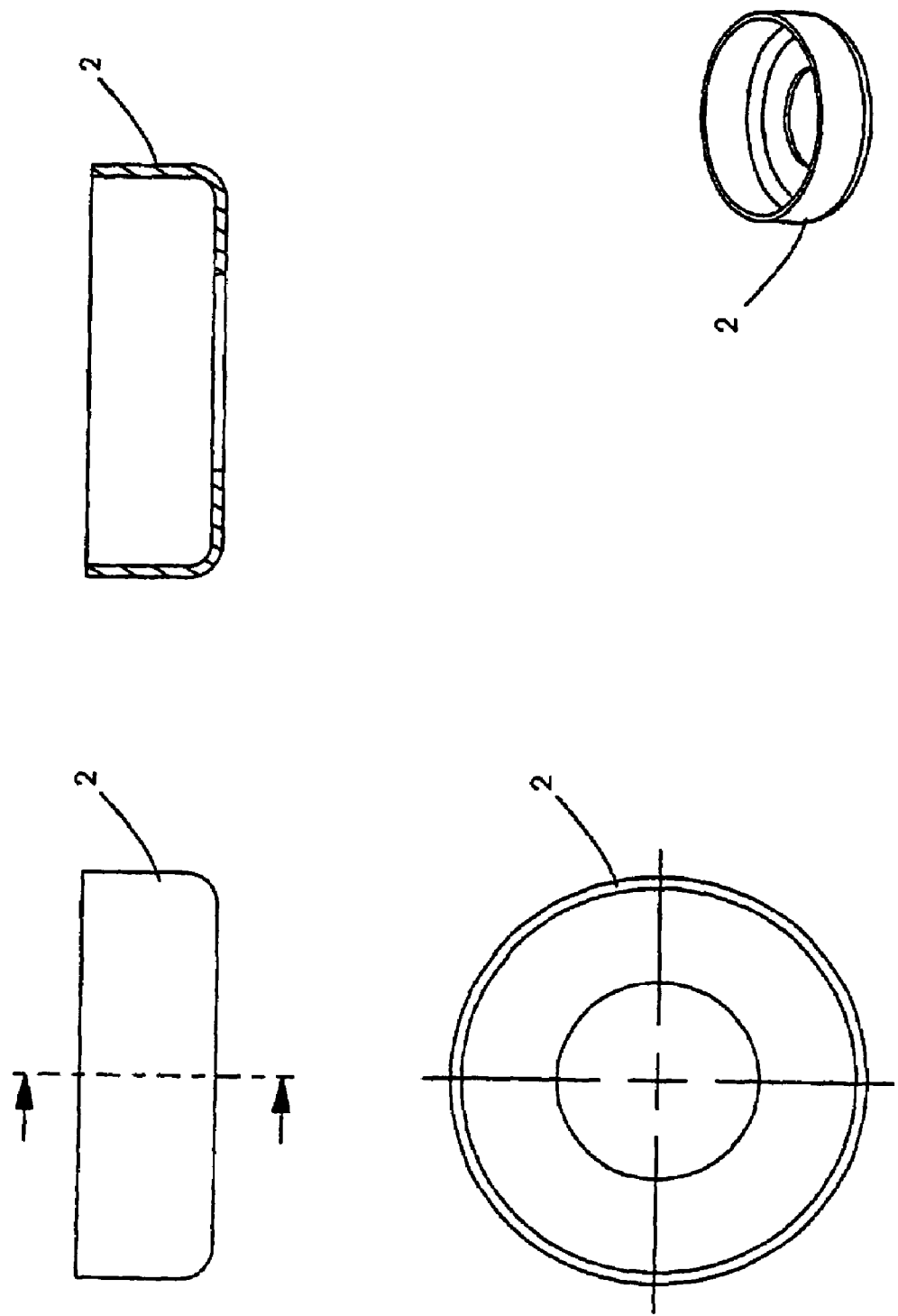
FIG. 7 shows different views of the housing bottom part.

FIG. 7 shows various views and a sectional representation of the housing bottom part 2, preferably fabricated as a metallic deep-drawn molded part.

Figure 8:
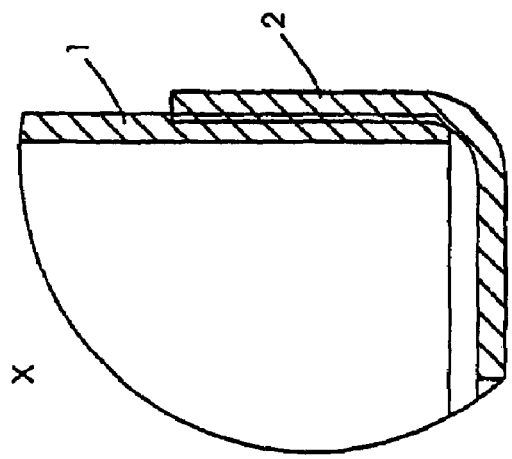
FIG. 8 shows a representation of a housing top and bottom part pressed together, still without metallic ring as adaptor for the cap for fixing the connecting cable.
Figure 8:
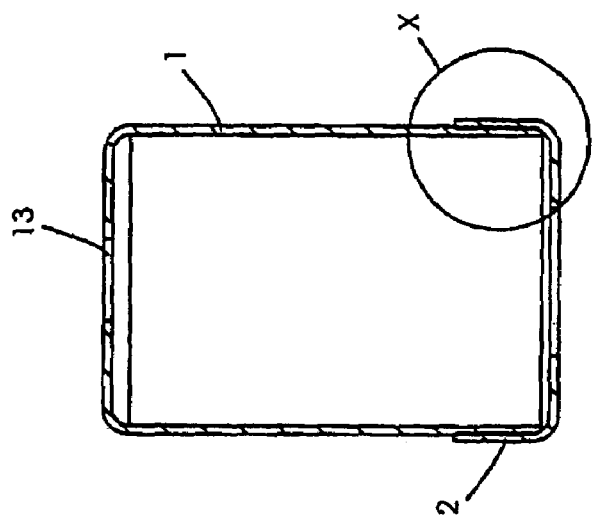
Figure 8:
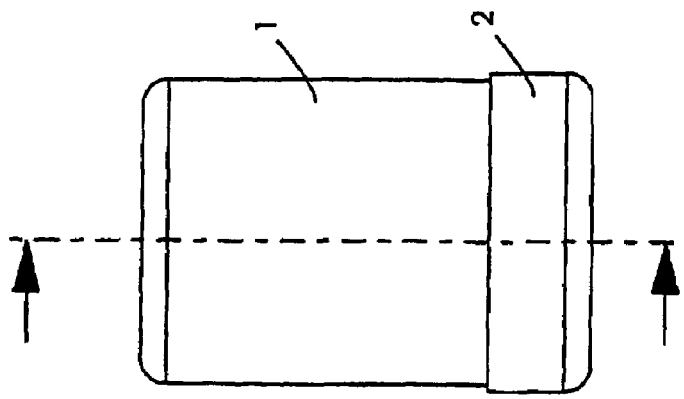

The representation of FIG. 8 shows an embodiment of the invention wherein the housing bottom part 2 is pressed across a lower section of the housing top part. It can be seen that the housing top part 1 need not necessarily have an increased inside diameter section. Also the housing bottom part 2 may be realized to include an expanded inside diameter to obtain the desired longitudinal press connection when the housing top part 1 and the housing bottom part 2 are joined.

It can be seen from FIGS. 9*a* and 9*b* as well as from the detail representation X that, instead of a separate ring 3, also a ring adaptor 19 integral with the housing top part 1 can be accomplished in a deep-drawing or stamping step.

In accordance with the representation of FIG. 9a and detail X the deep-drawn ring adaptor 19 may also include, as a result of mechanical reworking, a surrounding projection 16 as barb including the above-explained advantages.

FIG. 10 shows a lateral view of a pressed assembly, comprising a housing top part 1 and a housing bottom part 2 and an adaptor 3 fixed to the housing top part 1 to receive later on the metallic cap accommodating the connecting cable in its interior.

The representations according to FIGS. 11a and 11b are, again, based on a pressed assembly, comprising a housing top part 1 and a housing bottom part 2, wherein a cap 4 is already mounted on the ring 3, namely in an embodiment of a stepped metallic cap 4 according to FIG. 11a and a cylindrical cap 4 according to FIG. 11b, respectively.

As can be seen from the lateral view and the sectional view according to FIG. 12a the ring 3 already mentioned multiple times before, which was attached in the region of the through opening 13 to the housing part 1, e.g. by welding, serves the inner accommodation and guidance of the coat 14 of the connecting cable, specifically of the section thereof with the sealing lamellae 15 (see FIG. 3).

The metallic cap 4 now fixes the coated part of the connecting cable, with the outer upper end of the cap 4 representing a crimp section 20.

The representation of FIG. 12b substantially corresponds to that of FIG. 12a, however, with the difference that a deep-drawn ring adaptor 19 was formed out of the bottom of the housing top part 1.

LIST OF REFERENCE NUMERALS 1 housing top part
2 housing bottom part
3 metallic ring
4 metallic cap
5 electrical connecting cable
6 process connection
7 screwing surface
8 printed circuit board
9 end of connecting cable
10 insulating insert
11 surrounding collar
12 insertion slant
13 through opening
14 coat
15 sealing lamella
16 surrounding projection
17 surrounding recess
18 reduced diameter section
19 deep-drawn ring adaptor
20 crimp section

The invention claimed is:

1. An assembly for use in automation and process measurement technology, comprising an at least two-part compact housing having a sleeve-shaped housing bottom part and housing top part, wherein the housing parts serve as receiver for necessary electronic components and process connection means are provided on at least one housing part, wherein the housing top part and the housing bottom part are each made integrally from a creep-resistant material and have an overlapping region extending in an axial direction, wherein the cross-sectional shape of the housing top part and the housing bottom part is complementary at least in the overlapping region and the housing parts have an oversize relative to one another and the housing top and bottom parts are connectable to each other by axial pressing forces with oversize loss in a media-tight manner.

2. The assembly of claim 1, wherein one of the housing parts includes an expanded inside diameter collar which limits a distance to which the housing top part and the housing bottom part are joinable together in the overlapping region.

3. The assembly of claim 1, wherein at least one of the housing top part and the housing bottom part has formed therein a maximum of one through opening.

4. The assembly of claim 1, wherein the housing top part includes at least one of an insulating insert and an insulating coating.

5. The assembly of claim 1, wherein at least one of the housing top part and the housing bottom part is made of a deep-drawn material.

6. The assembly of claim 1, wherein the housing top part is formed as a hood, the hood having an open bottom side and an expanded inside diameter collar surrounding the open bottom side, the collar having an expanded length in an axial direction which limits a distance to which the housing top part and the housing bottom part are joinable together in the overlapping region, and wherein the housing top part and the housing bottom part, when connected to each other, define the housing in an assembled state, the housing in the assembled state having an inside surface which is smooth.

7. The assembly of claim 6, wherein the housing bottom part includes a wall having a wall thickness, and wherein the expanded inside diameter of the surrounding collar corresponds substantially to double the wall thickness of the housing bottom part.

8. The assembly of claim 1, wherein the housing parts are made of a metallic material, especially special steel.

9. The assembly of claim 8, wherein one of the housing parts includes an expanded inside diameter collar which limits a distance to which the housing top part and the housing bottom part are joinable together in the overlapping region.

10. The assembly of claim 8, wherein the housing top part is formed as a hood, the hood having an open bottom side and an expanded inside diameter collar surrounding the open bottom side, the collar having an expanded length in an axial direction which limits a distance to which the housing top part and the housing bottom part are joinable together in the overlapping region, and wherein the housing top part and the housing bottom part, when connected to each other, define the housing in an assembled state, the housing in the assembled state having an inside surface which is smooth.

11. The assembly of claim 8, wherein at least one of the housing top part and the housing bottom part has formed therein a maximum of one through opening.

12. The assembly of claim 6, wherein the open bottom side of the collar includes at least one of an insertion chamfer and an insertion slant.

13. The assembly of claim 12, wherein the housing bottom part has an oversized diameter with respect to an inside dimension of the collar of the housing top part.

14. The assembly of claim 12, wherein the housing bottom part includes a wall having a wall thickness, and wherein the expanded inside diameter of the surrounding collar corresponds substantially to double the wall thickness of the housing bottom part.

15. The assembly of claim 6, wherein the housing bottom part has an oversized diameter with respect to an inside dimension of the collar of the housing top part.

16. The assembly of claim 15, wherein the housing bottom part includes a wall having a wall thickness, and wherein the expanded inside diameter of the surrounding collar corresponds substantially to double the wall thickness of the housing bottom part.

17. An assembly for use in automation and process measurement technology, comprising an at least two-part compact housing having a sleeve-shaped housing bottom part and housing top part, wherein the housing parts serve as receiver for necessary electronic components and process connection means are provided on at least one housing part, wherein the housing top part and the housing bottom part are each made integrally from a creep-resistant material and have an overlapping region extending in an axial direction, wherein the cross-sectional shape of the housing top part and the housing bottom part is complementary at least in the overlapping region and the housing parts have an oversize relative to one another and the housing top and bottom parts are connectable to each other by axial pressing forces with oversize loss in a media-tight manner, wherein the housing top part has formed therein a through opening, and wherein the assembly further comprises a surrounding outwardly projecting connection piece and a connecting cable, the through opening of the housing top part being surrounded by the surrounding outwardly projecting connection piece, the connecting cable being introduced into the housing top part through the through opening, the connecting cable has having a grommet-like coat and a metallic cap.

18. The assembly of claim 17, wherein the grommet-like coat includes an end situated toward the housing top part and over its longitudinal expansion portions, each portion having a different stepped diameter, and wherein the grommet-like coat further includes several radially surrounding sealing lamellae located at the end situated toward the housing top part, the sealing lamellae being spaced apart from each other.

19. The assembly of claim 18, wherein the assembly further comprises a cap which has a shape which is complementary to the stepped diameter of the coat, the cap having a first end facing the housing top part and a second end situated opposite the first end, and wherein the first end of the cap facing the housing top part is connectable to the connection piece primarily in a force-closed manner while the opposite second end of the cap can be connected to the coat primarily in a form-closed manner.

20. The assembly of claim 19, wherein the form-closed manner includes crimping and the force-closed manner includes pressing.

\* \* \* \* \*